United States Patent [19]

Niebylski

[11] Patent Number: 5,166,001

[45] Date of Patent: Nov. 24, 1992

[54] CERAMIC COATINGS

[75] Inventor: Leonard M. Niebylski, Baton Rouge, La.

[73] Assignee: Ethyl Corporation, Richmond, Va.

[21] Appl. No.: 164,012

[22] Filed: Mar. 4, 1988

[51] Int. Cl.⁵ .............................................. B32B 9/04
[52] U.S. Cl. ...................................... 428/446; 501/88; 501/97; 427/226; 427/227; 524/442; 524/443; 524/789; 524/484; 428/447
[58] Field of Search .................. 501/88, 97; 427/226, 427/227; 524/442, 443, 789, 484; 428/446, 447

[56] References Cited

U.S. PATENT DOCUMENTS

| | | | |
|---|---|---|---|
| 4,397,828 | 8/1983 | Seyferth et al. | 423/344 |
| 4,482,669 | 11/1984 | Seyferth et al. | 524/442 |
| 4,645,807 | 2/1987 | Seyferth et al. | 524/474 |
| 4,650,837 | 3/1987 | Seyferth et al. | 525/478 |
| 4,659,850 | 4/1987 | Arai et al. | 556/409 |
| 4,689,252 | 8/1987 | Lebrun et al. | 501/88 |
| 4,720,532 | 1/1988 | Seyferth et al. | 524/442 |

*Primary Examiner*—Melvyn I. Marquis
*Attorney, Agent, or Firm*—Patricia J. Hogan

[57] ABSTRACT

Preceramic compositions which are useful in providing protective ceramic coatings on carbon/carbon composites, graphite, and other carbonaceous materials are prepared by dispersing about 0.4–1.5 parts by weight of silicon carbide, silicon nitride, or a mixture thereof in a solution of one part by weight of a polysilazane in about 2.5–10 parts by weight of a liquid aromatic hydrocarbon.

15 Claims, No Drawings

CERAMIC COATINGS

FIELD OF INVENTION

This invention relates to ceramic coatings and more particularly to such coatings derived from polysilazanes and silicon carbide and/or silicon nitride.

BACKGROUND

It is known that many carbonaceous materials, such as carbon/carbon composites and graphite, have properties which make them attractive for use in aerospace, tooling industry, and other applications but that articles formed from them can be damaged by heat and abrasion. It would be desirable to find a means of protecting them from such damage.

As disclosed in U.S. Pat. Nos. 4,397,828 (Seyferth et al.-I), 4,482,669 (Seyferth et al.-II), 4,645,807 (Seyferth et al.-III), 4,650,837 (Seyferth et al.-IV), and 4,659,850 (Arai et al.), it is known that ceramics can be obtained from polysilazanes. Seyferth et al.-II teach that their polysilazanes can be used to make coatings or to serve as binders for ceramic powders, such as silicon carbide and silicon nitride.

SUMMARY OF INVENTION

An object of this invention is to provide novel polysilazane compositions.

Another object is to provide such compositions which can be converted to ceramic coatings.

A further object is to provide carbonaceous materials coated with such compositions and with ceramics derived therefrom to protect them against heat and abrasion.

These and other objects are attained by intimately dispersing about 0.4–1.5 parts by weight of a ceramic powder selected from silicon carbide, silicon nitride, and mixtures thereof in a solution of one part by weight of a polysilazane in about 2.5–10 parts by weight of a liquid aromatic hydrocarbon and, when desired, applying the dispersion to a carbonaceous substrate, removing the solvent, and heating to form a ceramic.

DETAILED DESCRIPTION

The polysilazane used in the practice of the invention may be any polysilazane that is soluble in common organic solvents, such as aliphatic or aromatic hydrocarbons, dialkyl or alicyclic ethers, etc.; and it may be, e.g., a polysilazane of Seyferth et al.-I, Seyferth et al.-II, Seyferth et al.-III, Seyferth et al.-IV, or Arai et al., the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, or a mixture of such polysilazanes. For example, it may be one or more polysilazanes prepared by reacting methyldichlorosilane with ammonia, treating the ammonolysis product with potassium hydride, and quenching the resultant product with methyl iodide or dimethylchlorosilane.

The ceramic powder may be silicon carbide, silicon nitride, or a mixture thereof, but it is preferably silicon carbide. It is preferred that the powder have an average particle size of about 1–40 micrometers, and it is most preferred that the average particle size be about 1–10 micrometers to facilitate the formation of a homogeneous dispersion. Finer and coarser particles are also utilizable, but the dispersions formed from them are less homogeneous when the average particle size is much larger than about 10 micrometers. The amount of ceramic powder employed is about 0.4–1.5, preferably about 0.4–0.7, parts per part by weight of the polysilazane.

To prepare the dispersions of the invention, the ceramic powder is added to a solution of the polysilazane in a liquid aromatic hydrocarbon; and the mixture is agitated, e.g., by shaking or ultrasonicating it, to form a homogeneous dispersion. The polysilazane solution that is used is a clear solution; and the total amount of solvent employed is about 2.5–10, preferably about 3–5, parts per part by weight of the polysilazane.

The solvent employed for the polysilazane may be any liquid aromatic hydrocarbon, but it is preferably such a hydrocarbon having a boiling point of at least about 110° C., such as toluene, xylene, ethylbenzene, mesitylene, ethylmethylbenzene, cumene, and mixtures thereof. It is most preferably xylene, which may be pure or crude and is frequently used as a commercial mixture of xylene isomers, sometimes containing a minor amount of ethylbenzene.

The dispersions of the invention are preceramic materials which are useful for coating carbonaceous materials, such as fibers, tows, hanks, mats, and composites of carbon; carbon or graphite slabs, rods, and structures; etc., for which it is desired to provide a heat- and/or abrasion-resistant coating. When the dispersions are to be used to provide protective ceramic coatings on such materials, the surfaces to be coated are usually cleaned prior to the application of the coating composition in order to improve the bonding of the ceramic coating to the substrate. The bonding can sometimes be further improved by pre-etching the surfaces to be coated.

The dispersions of the invention may be applied to the substrates in any suitable manner, such as by spraying, swabbing, or brushing, to form coatings having the desired thickness, generally a thickness of up to about 1000 micrometers, frequently a thickness of about 50–125 micrometers. It is frequently preferred that the ultimate thickness of relatively thick coatings be provided by applying the preceramic coating composition in at least two thinner layers, e.g., by applying the coating composition in layers of about 50–125 micrometers, each layer being dried by driving off the solvent before the next layer is applied. When the desired thickness of preceramic coating has been deposited, the coating can then be pyrolyzed by heating it at a temperature of about 625–700° C., preferably about 650° C., until the coating is converted to a ceramic. This normally requires about 30–60 minutes, depending on the particular pyrolysis temperature selected.

Surprisingly, it is not necessary to keep the starting polysilazane and the compositions formed from it in an inert atmosphere until the ceramic has been formed because of the susceptibility of the preceramic materials to attack by water and other compounds having active hydrogens. The whole operation of preparing the dispersions, the preceramic coatings, and the ceramic coatings can be performed in dry air.

The invention is particularly advantageous as a means of providing heat- and abrasion-resistant coatings on carbonaceous substrates, such as the carbonaceous materials used in aerospace applications. However, particularly when the larger ceramic powder particles are employed in making the dispersions, it is also useful in providing anti-slip coatings on surfaces such as those on carbonaceous substrates.

The following examples are given to illustrate the invention and are not intended as a limitation thereof.

EXAMPLE I

Synthesis of Polysilazane

Part A

A suitable reaction vessel was charged with 14L of anhydrous tetrahydrofuran and cooled to about 0° C., after which 1545 g (13.43 mols) of methyldichlorosilane was cannulated into the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0-10° C. Then the reaction mixture was stirred at 0 C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0-22° C., the reaction was quenched by adding about 12.6 g (0.13 mol) of dimethylchlorosilane to the polymerization solution.

The polymer product was isolated by (1) concentrating the product solution to about 4L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Graphite coupons having nominal dimensions of about 3.8 cm × 2.5 cm × 0.3 cm were abraded to provide a smooth finish, cleaned, vacuum dried, and thoroughly swab-coated with a dispersion of 0.5 part by weight of silicon carbide in a solution of one part by weight of the polysilazane of Example I in four parts by weight of xylene. The coating was dried, heated at 100° C. for five minutes, heated to 150° C. at a rate of about 10° C./minute, held at 150° C. for 15-30 minutes, allowed to cool to room temperature, recoated until the coated coupon remained stable at 150° C. for 30 minutes, heated to about 175-186° C., maintained at that temperature for at least 15 minutes, and cooled to provide coupons having a coating thickness of about 0.08-0.1 mm. The coatings were then pyrolyzed to ceramic coats by heating the coated coupons to 650-700° C. and holding them at that temperature for 15-30 minutes before cooling to room temperature, and the coated coupons were then heated at 850° C. for 5-10 minutes.

The effectiveness of the ceramic coats thus obtained in protecting the graphite surface from thermal deterioration was determined by heating the coated coupons in air at 600.C. for one hour, counting the number of pits formed on the surface, and calculating the average number of pits per square inch of three samples. This average was only 8-86 pits/square inch, which compares with an average of 590-630 pits/square inch when uncoated graphite coupons are subjected to the same test and an average of 560-590 pits/square inch when graphite coupons are coated only with the polysilazane.

EXAMPLE III

Example II was essentially repeated except that the dispersion used to coat the coupons was a dispersion of 0.5 part by weight of silicon nitride in a solution of one part by weight of the polysilazane of Example I in four parts by weight of xylene. The average number of pits formed on three samples of the coated coupons was 22-140 pits/square inch.

EXAMPLE IV

A coupon of graphite 2.5 cm × 2.5 cm × 0.25 cm was abraded on 320 grit emery paper. A single abrasion stroke on the emery paper represents a forward stroke followed by a backward stroke. Fifty strokes of the uncoated graphite on the emery paper resulted in the loss of 0.670 g of graphite. The coated graphite coupon lost only 0.020 g of material after 50 strokes.

It is obvious that many variations can be made in the products and processes set forth above without departing from the spirit and scope of this invention.

What is claimed is:

1. An intimate dispersion of about 0.4-1.5 parts by weight of a ceramic powder in a solution of one part by weight of a polysilzane in about 2.5-10 parts by weight of a liquid aromatic hydrocarbon; said ceramic powder being silicon nitride or a mixture of silicon carbide and silicon nitride.

2. The dispersion of claim 1 which contains about 0.4-0.7 part by weight of ceramic powder per part by weight of polysilazane.

3. The dispersion of claim 1 wherein the ceramic powder has an average particle size of about 1-40 micrometers.

4. The dispersion of claim 3 wherein the ceramic powder has an average particle size of about 1-10 micrometers.

5. The dispersion of claim 1 wherein the ceramic powder is silicon nitride.

6. The dispersion of claim 1 wherein the ceramic powder is mixture of silicon carbide and silicon nitride.

7. The dispersion of claim 1 wherein the polysilazane is a polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

8. The dispersion of claim 7 wherein the organodihalosilane is methyldichlorosilane, the basic catalyst is potassium hydride, and the quenching reagent is dimethylchlorosilane.

9. The dispersion of claim 1 wherein the liquid aromatic hydrocarbon is a hydrocarbon having a boiling point of at least about 110° C.

10. The dispersion of claim 9 wherein the liquid aromatic hydrocarbon is xylene.

11. The dispersion of claim 1 which contains (A) about 0.4-0.7 part by weight of a ceramic powder having an average particle size of about 1-10 micrometers, (B) one part by weight of a polysilazane, and (C) about 2.5-10 parts by weight of xylene; said ceramic powder being silicon nitride or a mixture of silicon carbide and silicon nitride; said polysilazane being a polymer prepared by reacting methyldichlorosilane with ammonia, treating the ammonolysis product with potassium hydride, and quenching the resultant product with dimethylchlorosilane.

12. An article which comprises a carbonaceous substrate and a preceramic coating derived from the dispersion of claim 1.

13. The article of claim 12 wherein the dispersion is an intimate dispersion of about 0.4-0.7 part by weight of a ceramic powder having an average particle size of about 1-10 micrometers in a solution of one part by weight of a polysilazane in about 2.5-10 parts by weight of xylene; said ceramic powder being silicon nitride or a mixture of silicon carbide and silicon nitride; said polysilazane being a polymer prepared by reacting methyldichlorosilane with ammonia, treating the ammonolysis product with potassium hydride, and quenching the resultant product with dimethylchlorosilane.

14. The article of claim 13 wherein the carbonaceous substrate is graphite.

15. The article of claim 13 wherein the carbonaceous substrate is a carbon/carbon composite.

* * * * *